May 2, 1933.   J. A. BROWN   1,906,528
ICE CREAM HOLDER
Filed Dec. 4, 1929
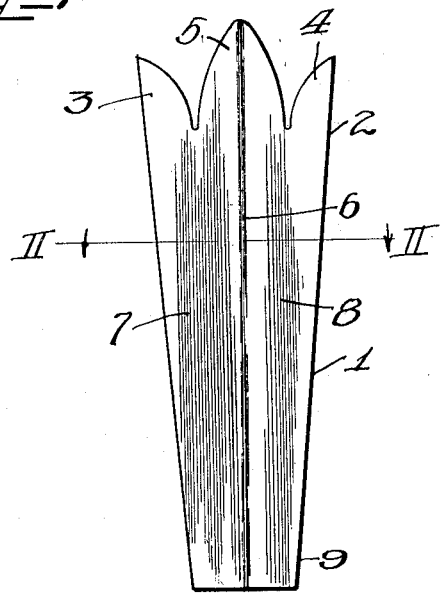
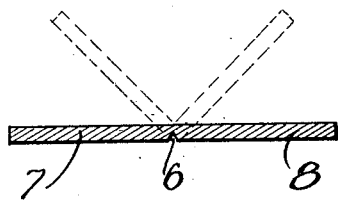
Inventor
Joseph A. Brown
by Charles H. Wills
Attys.

Patented May 2, 1933

1,906,528

UNITED STATES PATENT OFFICE

JOSEPH A. BROWN, OF CHICAGO, ILLINOIS, ASSIGNOR TO WHITE-STOKES COMPANY, INC., OF CHICAGO, ILLINOIS, A CORPORATION OF DELAWARE

ICE CREAM HOLDER

Application filed December 4, 1929. Serial No. 411,431.

This invention relates to a holder or handle for use in eating frozen confectionery and more particularly to a holder adapted to be inserted into a solid cake or dipper of ice cream to facilitate the manipulation of the frozen body while eating the same or while dipping it into a chocolate coating or the like.

It has already been proposed to facilitate the consumption of ice cream or other frozen confectionery by inserting a handle or holder into the frozen body as can be seen from the Kinnear Patent No. 1,678,436, and the Burt Patent No. 1,718,997. However, in the Burt patent, the stick or handle, which consists of a straight cylindrical piece of wood or candy, is secured in the frozen body by inserting the stick into the body while the body is still plastic and then freezing or congealing the body to the stick. On the other hand, Kinnear proposes to form a holder of a cylindrical stick having a disc or guard near the upper end of the same, the holder being inserted into a dipper or scoop of ice cream while in the dipper, the cream being released from the dipper with the stick embedded therein. In this latter construction there is very little adhesion between the holder and the ice cream so that when the latter becomes soft, it will not be retained on the holder.

I have now constructed a holder which, unlike the holder of Burt, can be inserted in the ice cream or other confectionery when the same is in the solid condition and which will effectively retain the frozen confectionery in position until it is consumed.

It is, accordingly, an object of this invention to provide a holder or handle for a cake or mass of ice cream which can be readily inserted into the ice cream while the ice cream is in a frozen condition.

It is a further object of this invention to provide a holder for a frozen body from a cardboard blank, the blank being shaped to form the holder immediately before being inserted into the frozen body.

It is also an object of this invention to provide a holder or handle for ice cream and similar frozen confectionery wherein the holder is so formed as to continually exert a frictional force against the frozen body in order to insure its retention in the body.

Other and further important objects of my invention will be apparent from the following description and claims.

Referring now to the drawing, which discloses a preferred form of my invention,

Figure 1 is a front elevation of a holder blank, as the same is shipped and received by the storekeeper or other user of the same.

Figure 2 is a section on the line II—II of Figure 1, showing in dotted lines the form assumed by the blank when creased to form the holder.

The holder blank indicated by the reference numeral 1 comprises a thin, flat, relatively stiff sheet of cardboard or other fibrous material, having at its upper end 2, three arcuate shaped prongs, 3, 4 and 5, the central prong 5 having substantially twice the width of prongs 3 and 4. Extending from the top of the central prong 5 to the bottom of the blank is a score line 6, dividing the blank into substantially two equal sections 7 and 8. The score is made of such a depth that the blank can be readily folded along the same, but at the same time leaving sufficient material under the line as to cause the blank to resist the folding or creasing action and assume its original flat form. In other words, the score line 6 is such that when the blank is folded along said line, the material under the score line forms a resilient hinge tending constantly to force sections 7 and 8 away from each other. This feature is of particular importance as will be presently described. When the blank has been folded, the prong 5 will be split in half forming two prongs on each section 7 and 8. As herein shown the blank is tapered from the upper end 2 to the lower end 9 thereof, but it is, of course, appreciated that this form may be varied without destroying the utility of the holder, it being sufficient if the upper part of the blank is composed of sufficient material to present a relatively large surface area to the frozen body secured thereon.

The holder or handle is usually shipped from the manufacturer in the form of the blank described above, in order to facilitate the shipment of the same. When it is desired to use the holder or handle, it is simply necessary for the store-keeper or other user of the same to fold the blank along the crease line 6 (See Fig. 2) and insert the same into a scoop, dipper, or cake of ice cream or other solid confectionery. Due to the resilient hinge connection formed by the material under the score line 6, the sections 7 and 8 of the holder tend to swing away from each other thus exerting a force on the ice cream thereby insuring the retention of the holder in the ice cream. Furthermore, by forming the upper end of the holder with the arcuate shaped prongs as disclosed, a greater gripping action is had between the holder and the frozen body. The adhesion between the frozen body and holder is further increased and the frozen body more firmly and securely supported on the holder by providing a relatively large number of points and a greater surface of contact between the frozen body and the holder.

It can, therefore, be seen that I have provided an efficacious device for holding frozen confectionery during consumption of the same, which device is quickly and easily made and which can be readily and economically shipped and which lends itself with facility to insertion in a solid frozen confectionery body.

I am aware that many changes may be made, and numerous details of construction may be varied through a wide range without departing from the principles of this invention, and I, therefore, do not purpose limiting the patent granted hereon, otherwise than necessitated by the prior art.

I claim as my invention:

1. A device for holding a mass of frozen confectionery, comprising a pair of relatively stiff fibrous bodies having pointed ends for insertion in to the frozen mass, said bodies being folded toward each other about a single score line from a blank of the stiff material in such a manner that they tend to swing away from each other due to the inherent stiffness of the material so that when they are positioned in the frozen mass they exert a substantial pressure thereagainst, thus materially increasing the adhesion between the device and the mass.

2. A device for holding a frozen mass, comprising a relatively stiff body composed of a pair of sections folded toward each other about a single score line from a blank in such a manner that when one end of the sections is inserted into a frozen mass they tend to move away from each other, due to the inherent stiffness of the material, thereby setting up a binding action between the sections and mass tending to maintain the sections in the mass.

3. A blank of a device for holding a frozen confectionery in the hands comprising a thin, substantially flat, relatively stiff fibrous body having a plurality of arcuate prongs at one end thereof for insertion into the mass, said body having a score line extending longitudinally of the body adjacent the mid part thereof so that the body may be creased before insertion into the frozen mass to form a pair of sections resiliently hinged together about the score line.

4. A blank of a device or holding a mass of frozen confectionery, comprising a substantially flat, thin, relatively stiff cardboard body having a plurality of integral arcuate prongs at one end thereof for insertion into the frozen mass, the innermost prong being of substantially twice the width of the outer prongs, said body having a score line extending the entire length of the same and along the approximate center line of the body and innermost prong, said score line being of such depth as to enable the body to be creased before insertion into the frozen mass to form a pair of sections having an equal number of prongs, resiliently hinged about said score line.

5. A blank of a device for holding a frozen mass, comprising a substantially flat, thin, elongated cardboard body having a plurality of prongs at the upper end thereof for insertion into the frozen mass, said body tapering gradually from said upper end and having a score line extending longitudinally along the approximate center line thereof, said score line being of such a nature that the body can be readily creased before insertion into the mass to form a pair of sections resiliently hinged about said score line in a manner tending to overcome the crease.

In testimony whereof I have hereunto subscribed by name at Chicago, Cook County, Illinois.

JOSEPH A. BROWN.